United States Patent
Yamada

(10) Patent No.: US 12,265,609 B2
(45) Date of Patent: Apr. 1, 2025

(54) TRAINING DEVICE, DETECTION SYSTEM, TRAINING METHOD, AND TRAINING PROGRAM

(71) Applicant: NIPPON TELEGRAPH AND TELEPHONE CORPORATION, Tokyo (JP)

(72) Inventor: Masanori Yamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 250 days.

(21) Appl. No.: 17/624,579

(22) PCT Filed: Jul. 18, 2019

(86) PCT No.: PCT/JP2019/028339
§ 371 (c)(1),
(2) Date: Jan. 4, 2022

(87) PCT Pub. No.: WO2021/009921
PCT Pub. Date: Jan. 21, 2021

(65) Prior Publication Data
US 2022/0269779 A1    Aug. 25, 2022

(51) Int. Cl.
*G06F 21/55* (2013.01)
*G16Y 30/10* (2020.01)

(52) U.S. Cl.
CPC ............ *G06F 21/552* (2013.01); *G16Y 30/10* (2020.01)

(58) Field of Classification Search
CPC . H04L 63/1416; G06F 21/554; G06F 21/552; G06F 17/18; G06N 3/088; G06N 3/047
See application file for complete search history.

(56) References Cited

U.S. PATENT DOCUMENTS

| 8,544,087 B1 * | 9/2013 | Eskin | G06F 21/552 726/22 |
| 2017/0339168 A1 * | 11/2017 | Balabine | G06F 16/951 |

FOREIGN PATENT DOCUMENTS

| CN | 107657602 A | 2/2018 |
| CN | 109145939 A | 1/2019 |

(Continued)

OTHER PUBLICATIONS

Kingma et al., "Auto-Encoding Variational Bayes", Available Online at: https://arxiv.org/abs/1312.6114, May 1, 2014, pp. 1-14.

(Continued)

*Primary Examiner* — Paul E Callahan
(74) *Attorney, Agent, or Firm* — XSENSUS LLP

(57) ABSTRACT

A learning apparatus includes: a first estimation unit—configured to learn normal communication data, estimate probability density of the normal communication data, and update a parameter of a model; a clustering unit configured to cluster the normal communication data according to the probability density estimated by the first estimation unit; a second estimation unit configured to perform learning for each of clusters resulting from the clustering by the clustering unit, and estimate the probability density of the normal communication data of the cluster and update a parameter of a model representing characteristics of the probability density of the normal communication data of the cluster by using, as an initial value of the parameter, a parameter having already been learned in the first estimation unit; and an integration unit configured to integrate the estimated probability density of the clusters.

16 Claims, 16 Drawing Sheets

(56) References Cited

FOREIGN PATENT DOCUMENTS

| | | | |
|---|---|---|---|
| CN | 109213805 A | 1/2019 | |
| CN | 109583594 A | 4/2019 | |
| JP | 2019101982 A | * 6/2019 | ......... H04L 63/1425 |

OTHER PUBLICATIONS

Keydana et al., "Variational Autoencoders for a Nomaly Detection", Available Online at:https://rstudio-pubs-static.s3.amazonaws.com/308801_ca2c3b7a649b4fd1838402ac0cb921e0.html, Sep. 2017, 42 pages.

* cited by examiner

TRAINING DEVICE, DETECTION SYSTEM, TRAINING METHOD, AND TRAINING PROGRAM

CROSS-REFERENCE TO RELATED APPLICATION

The present application is based on PCT filing PCT/JP2019/028339, filed Jul. 18, 2019, the entire contents of which are incorporated herein by reference.

FIELD

The present invention relates to a learning apparatus, a detection system, a learning method, and a learning program.

BACKGROUND

The age of the Internet of things (IoT) has arrived, which has allowed various apparatus (IoT apparatus) to be connected to the Internet and used in various ways. The IoT apparatus create value when a plurality of services are used in conjunction with each other. This has allowed every possible element to operate in conjunction with each other, leading to vulnerability due to occurrence of unexpected combinations. For this reason, security (in particular, abnormality detection) of IoT apparatus is important.

The IoT apparatus are diverse, and hence in order to support various types of IoT apparatus, many abnormality detection apparatus use deep learning. Further, in order to cope with zero-day attacks, as abnormality detection apparatus of the IoT apparatus, unsupervised abnormality detection apparatus of an anomaly type are used in many cases.

For example, as such an abnormality detection apparatus of an IoT apparatus, a probability density estimation apparatus with unsupervised learning such as a variational auto encoder (VAE) may be used. In the technology, the probability density of normal communication data is learned, and then communication having low probability density is detected as an abnormality. Thus, in the technology, it is only required that only normal communication data be learned, allowing for abnormality detection without learning of all malicious data. Therefore, the technology is effective for detection of threats for IoT apparatus, which are still in a transitional phase and whose entire threat information has not yet been known.

CITATION LIST

Patent Literature

Non Patent Literature 1: Diederik P. Kingma, Max Welling, "Auto-Encoding Variational Bayes", [searched on Jul. 5, 2019], Internet <URL:https://arxiv.org/abs/1312.6114>

Non Patent Literature 2: S. Keydana et al., "Variational autoencoders for anomaly detection," September 2017., [searched on Jul. 5, 2019], Internet <URL:https://rstudio-pubs-static.s3.amazonaws.com/308801_ca2c3b7a649b4fd1838402ac0cb921e0.html>

SUMMARY

Technical Problem

However, the probability density estimation apparatus such as the VAE may not be able to learn accurately when there is a difference in the number of pieces of data between pieces of normal communication data of a learning target.

In communication data, there is often a difference in the number of pieces of data. For example, hypertext transfer protocol (HTTP) communication or the like is often used, and thus a large amount of data is collected within a short period of time. In contrast, in network time protocol (NTP) communication or the like whose communication is only rarely performed, not a large number of pieces of data is collected. When learning using a VAE is performed under such a circumstance, learning of NTP communication having a smaller number of pieces of data may not succeed, and occurrence probability may be underestimated, which may be a factor of excessive detection for normal communication data. In addition, for the sake of prompt security of IoT apparatus, an increase in speed of learning time has also been required.

The present invention is made in the light of the circumstances as described above, and has an object to provide a learning apparatus, a detection system, a learning method, and a learning program that enable accurate and high-speed learning of the probability density of communication data.

Solution to Problem

A learning apparatus includes: an acquisition unit configured to acquire a plurality of pieces of normal communication data being a learning target; a first estimation unit configured to learn the normal communication data, estimate probability density of the normal communication data, and update a parameter of a model; a clustering unit configured to cluster the normal communication data according to the probability density estimated by the first estimation unit; a second estimation unit configured to perform learning for each of clusters resulting from clustering by the clustering unit, and estimate respective pieces of probability density of the normal communication data for respective clusters and update a parameter of a model representing characteristics of the probability density of the normal communication data for each of the clusters by using, as an initial value of the parameter, a parameter learned in the first estimation unit; and an integration unit configured to integrate the respective pieces of probability density for the respective clusters that are estimated.

A detection system includes: a detection apparatus configured to detect an abnormality of communication data, based on a model representing characteristics of probability density of communication data; and a learning apparatus configured to update a parameter of the model, wherein the learning apparatus includes an acquisition unit configured to acquire a plurality of pieces of normal communication data being a learning target, a first estimation unit configured to learn the normal communication data, and estimate the probability density of the normal communication data, a clustering unit configured to cluster the normal communication data according to the probability density estimated by the first estimation unit, a second estimation unit configured to perform learning for each of clusters resulting from clustering by the clustering unit, and estimate respective pieces of probability density of the normal communication data for respective clusters and update a parameter of a model for each of the clusters by using, as an initial value of the parameter, a parameter learned in the first estimation unit, and an integration unit configured to integrate the respective pieces of probability density for the respective clusters that are estimated, and the detection apparatus includes a third estimation unit configured to apply the parameter of the model updated by the second estimation unit, and estimate the probability density of communication data of a detection target and a detection unit configured to detect presence or absence of an abnormality of the communication data of the detection target, based on the probability density estimated by the third estimation unit.

A learning method executed by a learning apparatus, the learning method includes: a step of acquiring a plurality of pieces of normal communication data being a learning target;

a step of learning the normal communication data, and estimating probability density of the normal communication data;

a step of clustering the normal communication data according to the probability density estimated in the learning of the normal communication data; a step of performing learning for each of clusters resulting from the clustering, and estimating respective pieces of probability density of the normal communication data for respective clusters and updating a parameter of a model representing characteristics of the probability density of the normal communication data for each of the clusters by using, as an initial value of the parameter, a parameter learned in the learning of the normal communication data; and a step of integrating the respective pieces of probability density for the respective clusters that are estimated.

A learning program that causes a computer to execute:

a step of acquiring a plurality of pieces of normal communication data being a learning target; a step of learning the normal communication data, and estimating probability density of the normal communication data; a step of clustering the normal communication data according to the probability density estimated in the learning of the normal communication data; a step of performing learning for each of clusters resulting from the clustering, and estimating respective pieces of probability density of the normal communication data for respective clusters and updating a parameter of a model representing characteristics of the probability density of the normal communication data for each of the clusters by using, as an initial value of the parameter, a parameter learned in the learning of the normal communication data; and a step of integrating the respective pieces of probability density for the respective clusters that are estimated.

Advantageous Effects of Invention

According to the present invention, the probability density of the communication data can be learned accurately and at high speed.

BRIEF DESCRIPTION OF DRAWINGS

FIG. 10-1 is a diagram illustrating learning results in a VAE of the first stage.

FIG. 10-2 is a diagram illustrating learning results for cluster 0 in a VAE of the second stage.

FIG. 10-3 is a diagram illustrating learning results for cluster 1 in a VAE of the second stage.

FIG. 10-4 is a diagram illustrating learning results for cluster 2 in a VAE of the second stage.

FIG. 10-5 is a diagram illustrating learning results for cluster 3 in a VAE of the second stage.

DESCRIPTION OF EMBODIMENT

Hereinafter, an embodiment of the present invention will be described in detail with reference to the drawings. Note that the present invention is not limited by the embodiment. Note that in description of the drawings, the same components are denoted by the same reference signs.

Embodiment

Figure 1:
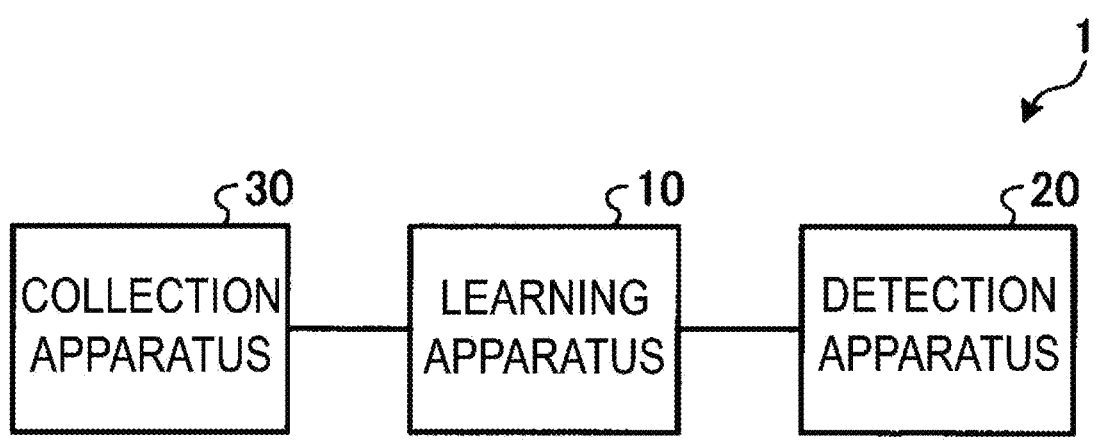
FIG. 1 is a diagram illustrating an example of a configuration of a detection system according to an embodiment.

An embodiment of the present invention will be described. FIG. 1 is a diagram illustrating an example of a configuration of a detection system according to an embodiment.

As illustrated in FIG. 1, a detection system 1 according to the embodiment includes a collection apparatus 30, a learning apparatus 10, and a detection apparatus 20. The collection apparatus 30, the learning apparatus 10, and the detection apparatus 20 are, for example, connected via a network or the like. Further, the collection apparatus 30, the learning apparatus 10, and the detection apparatus 20 are, for example, connected with an external apparatus via a network or the like.

The collection apparatus 30 collects a plurality of pieces of communication data that are generated from an IoT apparatus. For example, an acquisition unit 11 performs collection of traffic sessions via a network. The collection apparatus 30 collects a plurality of pieces of normal communication data (learning target data) being a learning target, and outputs the plurality of pieces of normal communication data to the learning apparatus 10. Further, the collection apparatus 30 collects a plurality of pieces of communication data (detection target data) being a detection target, and outputs the plurality of pieces of communication data to the detection apparatus 20.

The learning apparatus 10 learns the plurality of pieces of normal communication data, and updates parameters of models representing characteristics of the probability density of the normal communication data. The learning apparatus 10 performs learning of estimating the probability density on the communication data of the learning target separately in two stages.

First, in the learning of the first stage, the learning apparatus 10 roughly estimates the probability density of the input communication data. Subsequently, the learning apparatus 10 clusters the normal communication data according to the probability density, based on the estimation results. Then, in the learning of the second stage, the learning apparatus 10 estimates the probability density of the communication data of each cluster for each cluster. Here, in the learning of the second stage, the learning apparatus 10 uses the parameters that have already been learned in the first stage as initial values of the parameters. Subsequently, by integrating the estimated probability density of each cluster, even when there is a difference in the number of pieces of data between the pieces of communication data of the learning target, models with which abnormality detection can be accurately performed are obtained.

The detection apparatus 20 applies the parameters of the models that are updated by the learning apparatus 10, and estimates the probability density of the communication data of the detection target. Subsequently, when the estimated probability density is lower than a predetermined threshold, the detection apparatus 20 detects that there is an abnormality in the communication data of the detection target, and notifies an external apparatus that copes with the abnormality or the like of the occurrence of an abnormality of the communication data.

[Configuration of Learning Apparatus]

Figure 2:
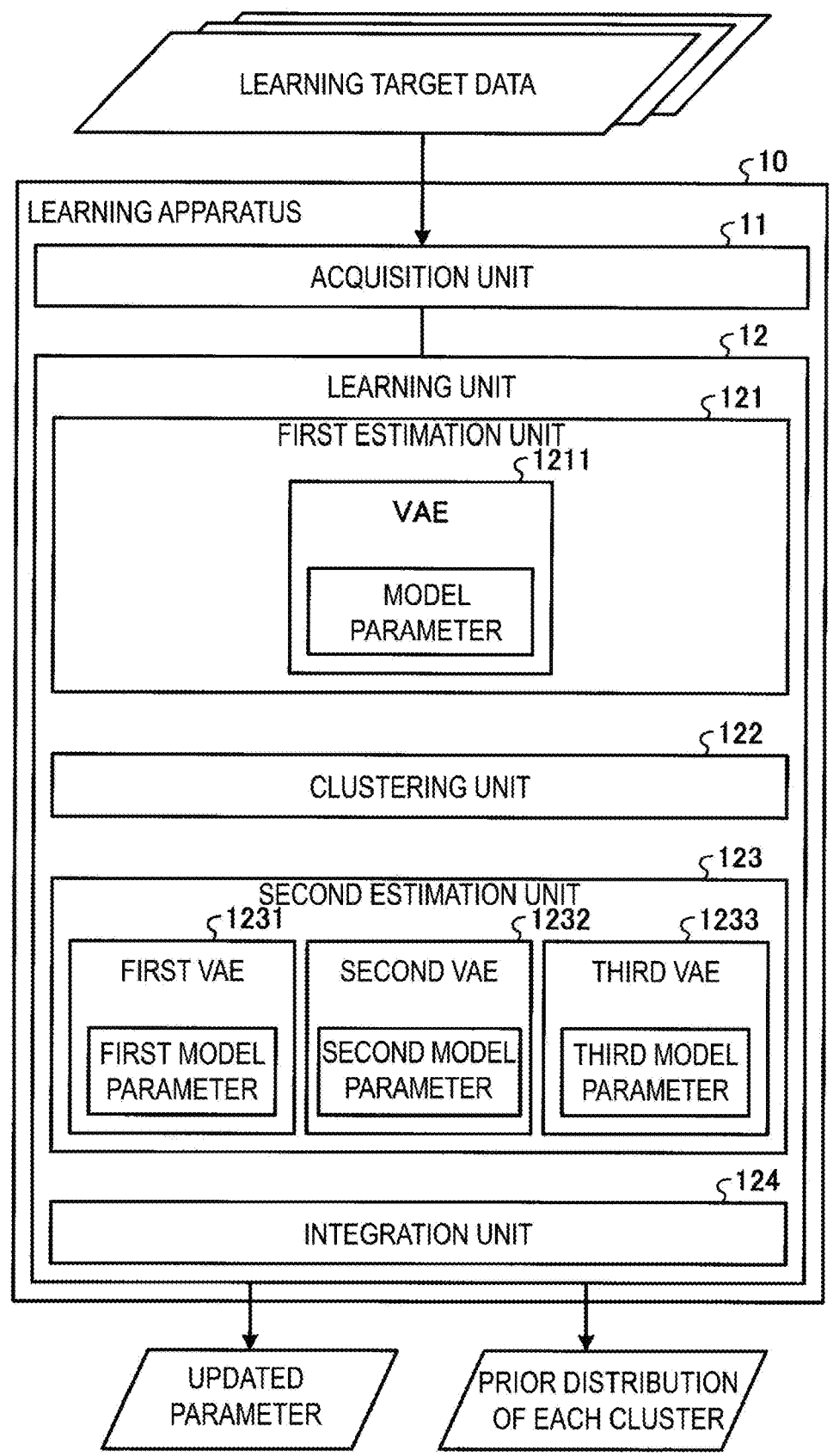
FIG. 2 is a diagram illustrating an example of a configuration of a learning apparatus illustrated in FIG. 1.

Next, a configuration of the learning apparatus 10 will be described. FIG. 2 is a diagram illustrating an example of a configuration of the learning apparatus 10 illustrated in FIG. 1. As illustrated in FIG. 2, the learning apparatus 10 includes an acquisition unit 11 and a learning unit 12.

Note that the learning apparatus 10 is, for example, implemented by a computer including a read only memory (ROM), a random access memory (RAM), a central processing unit (CPU), and the like reading a predetermined program and by the CPU executing the predetermined program. The learning apparatus 10 has a communication interface that transmits and receives various pieces of information to and from another apparatus connected via a network or the like. For example, the learning apparatus 10 includes a network interface card (NIC) or the like, and performs communication with another apparatus via a telecommunication line such as a local area network (LAN) or the Internet.

The acquisition unit 11 acquires a plurality of pieces of normal communication data (learning target data) being a learning target. For example, the acquisition unit 11 acquires normal traffic sessions being the learning target from the collection apparatus 30 via a network.

In this case, there may be a difference in the number of pieces of data between the pieces of communication data acquired by the acquisition unit 11. Specifically, HTTP communication as communication is often used, and thus the acquisition unit 11 can acquire normal HTTP communication data. In contrast, FTP communication for management is not frequently used, and thus the acquisition unit 11 may be able to obtain only a limited number of pieces of normal FTP communication data. In this manner, there may be a difference in the number of pieces of data between the pieces of data of the learning target data acquired by the acquisition unit 11. Even when there is a difference in the number of pieces of data, by performing learning separately in two stages, the learning apparatus 10 obtains models with which abnormality detection can be accurately performed.

Next, the learning unit 12 will be described. The learning unit 12 includes a first estimation unit 121, a clustering unit 122, a second estimation unit 123, and an integration unit 124.

The first estimation unit 121 learns the learning target data acquired by the acquisition unit 11, estimates the probability density of the learning target data, and updates the parameters of the models. In this case, the first estimation unit 121 estimates the probability density of the learning target data by using a VAE 1211 as a probability density estimation apparatus. The learning in the first estimation unit 121 corresponds to the learning in the learning in the first stage.

Figure 3:
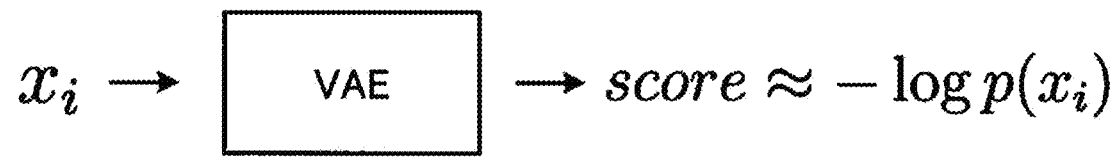
FIG. 3 is a diagram illustrating a VAE.
Figure 4:
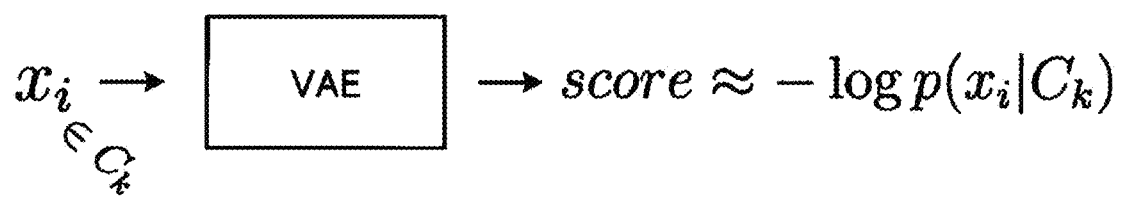
FIG. 4 is a diagram illustrating the VAE.

Here, the VAE will be described. FIGS. 3 and 4 are diagrams illustrating the VAE. As illustrated in FIG. 3, when the VAE receives input of a certain data point $x_i$, the VAE outputs an anomaly score (abnormality degree) that corresponds to the data. When the probability density is represented by $p(x_i)$, the anomaly score is represented by an approximate value of $-\log p(x_i)$.

In a similar manner, as illustrated in FIG. 4, when the data point $x_i$ belonging to a certain cluster $C_k$ is input to the VAE, the anomaly score is an approximate value of $-\log p(x_i|C_k)$. In this manner, a higher value of the anomaly score output by the VAE indicates a higher abnormality degree of the communication data.

The first estimation unit 121 includes the VAE 1211 that performs such calculation as described above, and learns a plurality of input pieces of learning target data and outputs the anomaly score of each of the pieces of the learning target data. In this case, the first estimation unit 121 updates the model parameters of the VAE 1211 according to the learning results.

The clustering unit 122 clusters the learning target data according to the probability density estimated by the first estimation unit 121. In other words, the clustering unit 122 performs clustering, based on the anomaly score estimated roughly by the first estimation unit 121, instead of directly applying algorithm of clustering to the learning target data. Thus, the clustering unit 122 performs clustering in consideration of characteristics of the learning target data, specifically, the density of the learning target data (the number of pieces of data). The clustering unit 122 performs clustering by using Bayesian Gaussian mixture models (GMM) algorithm, variational Bayesian (VB) GMM algorithm, or the like.

The second estimation unit 123 performs learning for each cluster that is clustered by the clustering unit 122, estimates the probability density of the learning target data of each cluster, and updates the parameters of the models representing characteristics of the probability density of the learning target data of each cluster. The second estimation unit 123 uses the parameters that have already been learned in the first estimation unit 121 as the initial value of the parameters.

For example, when the learning target data is clustered into three clusters by the clustering unit 122, the second estimation unit 123 includes a first VAE 1231, a second VAE 1232, and a third VAE 1233 that correspond to the three respective clusters. The first VAE 1231, the second VAE 1232, and the third VAE 1233 perform learning for the respective clusters by using the parameters that have already been learned in the first estimation unit 121 as the initial values of the parameters, and update the parameters of the models of each of the three clusters. Then, the first VAE 1231, the second VAE 1232, and the third VAE 1233 estimate anomaly scores of the respective clusters. The learning in the first VAE 1231, the second VAE 1232, and the third VAE 1233 corresponds to the learning in the second stage.

The integration unit 124 integrates the probability densities of the clusters that are estimated by the respective probability density estimation apparatus of the second estimation unit 123. In the example of FIG. 2, the integration unit 124 integrates the anomaly score of each cluster that is estimated by each of the first VAE 1231, the second VAE 1232, and the third VAE 1233.

Then, the learning apparatus 10 outputs the parameters of each model of the respective clusters that are updated by the respective VAEs of the second estimation unit 123, to the detection apparatus 20. Further, the learning apparatus 10 outputs prior distribution (described later) of each cluster to the detection apparatus 20.

[Processing of Integration Unit]

Next, integration processing performed by the integration unit 124 will be described. The integration unit 124 integrates the probability density of each cluster that is estimated by an individual VAE of the second estimation unit 123, and performs calculation of obtaining the probability density of the whole learning target data. The integration unit 124 calculates the sum of the products each obtained by multiplying probability distribution $p(x|C_k)$ followed by each cluster $C_k$ and prior distribution $p(C_k)$ of a cluster corresponding to the cluster $C_k$ as an integrated value of the probability density of each cluster, based on the probability density of each cluster that is estimated by an individual VAE of the second estimation unit 123. To express the calculation in an expression, the calculation can be expressed as in equation (1) below.

$$p(x) = \sum_k p(x|C_k)p(C_k) \tag{1}$$

In the example of FIG. 2, the first VAE 1231, the second VAE 1232, and the third VAE 1233 perform learning of the probability distribution $p(C_k)$ followed by the data of each of the clusters $C_1$, $C_2$, and $C_3$. Through the learning, the first VAE 1231 outputs score 1 being an approximate value of $-\log p(x_i|C_1)$. The second VAE 1232 outputs score 2 being an approximate value of $-\log p(x_i|C_2)$. The third VAE 1233 outputs score 3 being an approximate value of $-\log p(x_i|C_3)$.

Here, a desired final score is an approximate value of $-\log p(x_i)$. Thus, the integration unit 124 calculates the final score as in equation (2) below, based on equation (1).

$$\text{score} = -\log\left(\sum_k \exp(-score_k)p(C_k)\right) \tag{2}$$

Here, how the prior distribution $p(C_k)$ of each cluster is calculated may vary in some degree. In one example, in the present embodiment, a of a regularization term is introduced, and the prior distribution $p(C_k)$ is calculated as equation (3) below.

$$p(C_k) = \frac{|C_k| + \alpha}{\sum_l (|C_l| + \alpha)} \tag{3}$$

In equation (3), $|C_k|$ represents the number of pieces of data belonging to the cluster $C_k$. In addition, in the present embodiment, the integration unit 124 may perform calculation of the prior distribution $p(C_k)$ by using equation (4) by regarding a as an infinite limit.

$$p(C_k) = \frac{1}{K} \tag{4}$$

Note that, in equation (4), K represents the number of clusters. In this case, expression (5) below is satisfied.

$$p(x) \approx \max_k[p(x|C_k)] \tag{5}$$

Thus, the integration unit 124 may simply use a minimum value of the anomaly score as the final score. Thus, as an approximation of the above final score, the relationship of expression (6) below is also satisfied.

$$\text{score} \approx \min_k[score_k] \tag{6}$$

When processing speed is required, the integration unit 124 can calculate the final score by using expression (6). Note that the integration unit 124 outputs the prior distribution $p(C_k)$ of each cluster calculated by using equation (3) or equation (4), to the detection apparatus 20.

[Configuration of Detection Apparatus]

Figure 5:
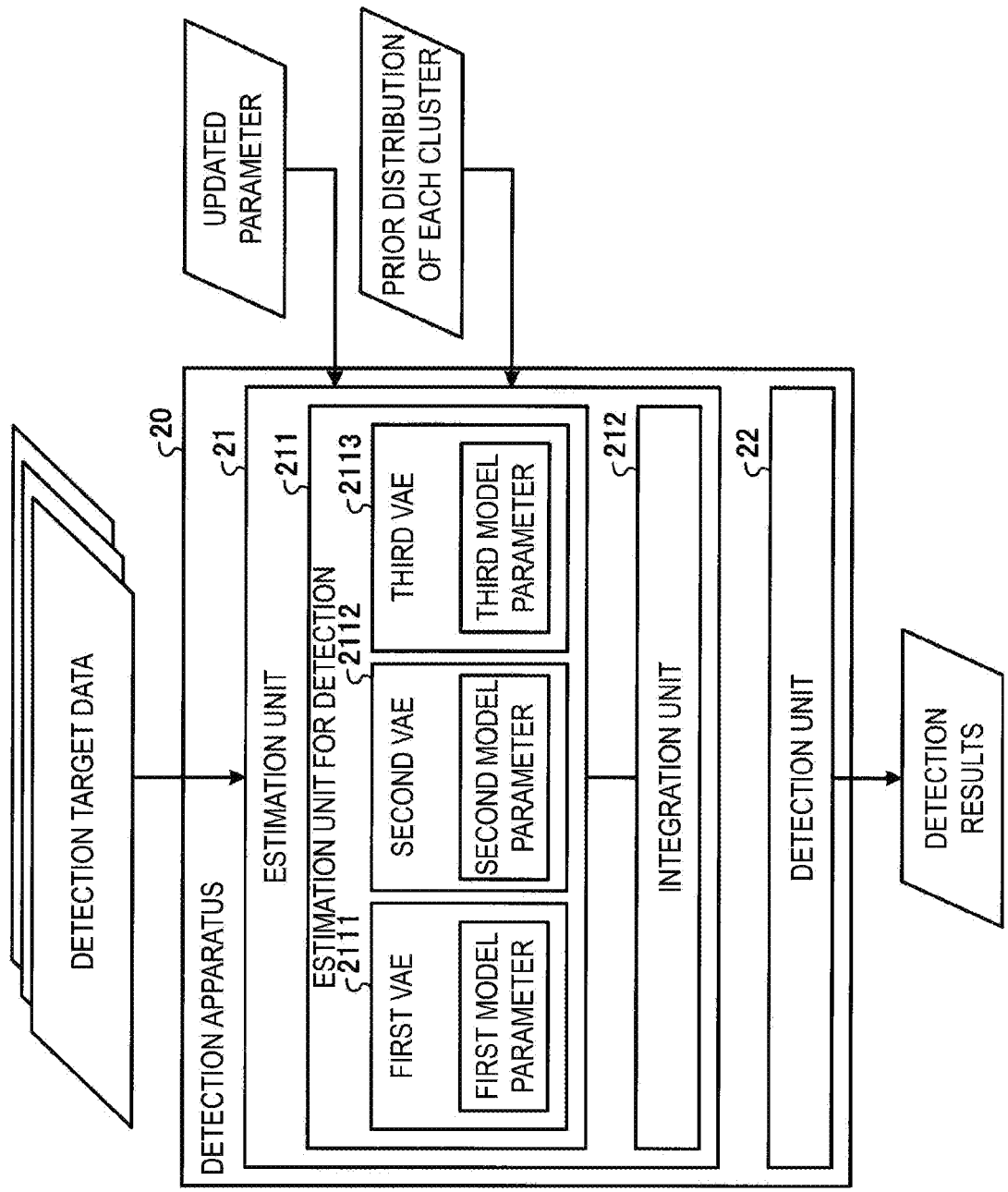
FIG. 5 is a diagram illustrating an example of a configuration of a detection apparatus illustrated in FIG. 1.

Next, a configuration of the detection apparatus 20 will be described. FIG. 5 is a diagram illustrating an example of a configuration of the detection apparatus 20 illustrated in FIG. 1. As illustrated in FIG. 5, the detection apparatus 20 includes an estimation unit 21 and a detection unit 22. To the detection apparatus 20, communication data (detection target data) of the detection target of presence or absence of an abnormality is input. Further, to the detection apparatus 20, updated parameters of each VAE and the prior distribution of each cluster output by the learning apparatus 10 are input.

Note that the detection apparatus 20 is, for example, implemented by a computer including a ROM, a RAM, a CPU, and the like reading a predetermined program and by the CPU executing the predetermined program. The detection apparatus 20 has a communication interface that transmits and receives various pieces of information to and from another apparatus connected via a network or the like. For example, the detection apparatus 20 includes an NIC or the like, and performs communication with the other apparatus via a telecommunication line such as a LAN or the Internet.

The estimation unit 21 includes an estimation unit for detection 211 (third estimation unit) and an integration unit 212. The estimation unit for detection 211 applies the parameters of the models updated by the second estimation unit 123, and estimates the probability density of the detection target data. The estimation unit for detection 211 includes probability density estimation apparatus the number of which is identical to that of the probability density estimation apparatus included in the second estimation unit 123.

In the example of FIG. 5, the estimation unit for detection 211 includes a first VAE 2111, a second VAE 2112, and a third VAE 2113, the number of which is the same as that of the VAEs included in the second estimation unit 123. The first VAE 2111, the second VAE 2112, and the third VAE 2113 estimate each anomaly score of their corresponding cluster. Note that the parameters of the models of each of the first VAE 2111, the second VAE 2112, and the third VAE 2113 are set for each parameter updated by the second estimation unit 123.

In a similar manner to the integration unit 124, the integration unit 212 integrates the probability density estimated by each probability density estimation apparatus of the estimation unit for detection 211 for each of the detection target data, and outputs the probability density after integration to the detection unit 22 as the probability density of the detection target data. In the example of FIG. 5, the integration unit 212 integrates the anomaly score of each cluster that is estimated by each of the first VAE 2111, the second VAE 2112, and the third VAE 2113.

The detection unit 22 detects presence or absence of the abnormality of the detection target data, based on the probability density estimated by the estimation unit for detection 211. When the probability density of the detection target data is lower than a predetermined threshold, the detection unit 22 detects that there is an abnormality in the detection target data. Specifically, when the anomaly score estimated by the estimation unit for detection 211 is higher than a predetermined value, the detection unit 22 detects that there is an abnormality in the detection target data.

[Procedure of Learning Processing]

Figure 6:
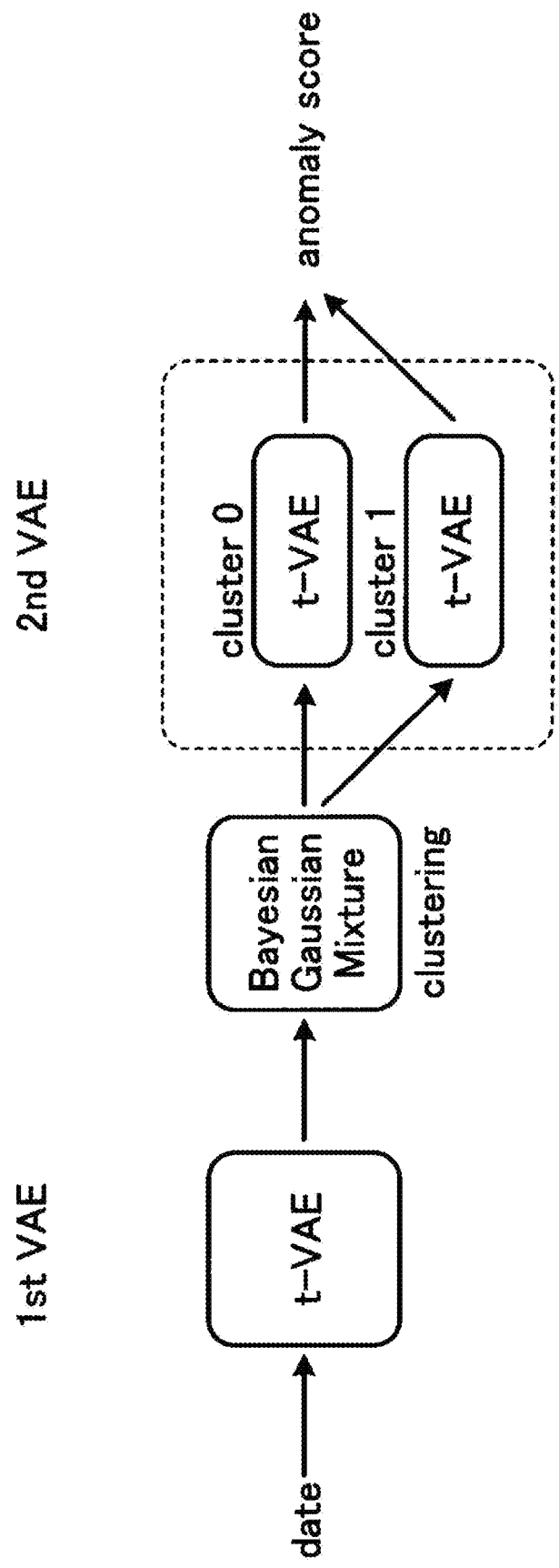
FIG. 6 is a diagram illustrating a procedure of learning processing according to the present embodiment.

Next, a procedure of learning processing will be described. FIG. 6 is a diagram illustrating a procedure of the learning processing according to the present embodiment.

In the learning apparatus 10, as illustrated in FIG. 6, the VAE 1211 (1st VAE) of the first estimation unit 121 learns learning target data and estimates the probability density, and updates the parameters of the models included in the VAE 1211. Specifically, as shown in expression (7), a first-stage probability density estimation apparatus (1st VAE) performs probability density estimation, based on a set$\{x\}$ of pieces of normal data. Note that x is represented as an element of $\{x\}$.

$$\{x\} \rightarrow P_\theta(x) \quad (7)$$

In expression (7), $\theta$ is a parameter of learning. Here, it is assumed that $\{x\}$ includes $\{x_a\}$ and $\{x_b\}$, and regarding the number of pieces of data, $\{x_a\}$ is by far larger than $\{x_b\}$.

In the learning of only the first stage, communication data$\{x_b\}$ having low density of the number of pieces of data shows a high anomaly score, and learning cannot be appropriately performed for the communication data having low density of the number of pieces of data. Specifically, because the number of $\{x_b\}$ is small, a learning apparatus fails to sufficiently learn, and expression (8) below is obtained.

$$P_\theta(x_a) \gg P_\theta(x_b) \quad (8)$$

In view of this, the learning apparatus 10 appropriately learns the learning target data regardless of the number of pieces of data, and thus separately learns the data having a large number of pieces of data and the data having a small number of pieces of data.

Specifically, in the learning apparatus 10, the clustering unit 122 performs clustering according to the number of pieces of data, specifically, clustering according to the probability density, for the learning target data. Note that, in the example of FIG. 6, the clustering unit 122 uses algorithm of Bayesian GMM. Through the clustering performed by the clustering unit 122, it is expected to obtain separate sets of $\{x_a\}$ (cluster 0) and $\{x_b\}$ (cluster 1).

Then, in the second estimation unit 123, the probability density estimation apparatus (each t-VAE of the 2nd VAE) are prepared for the respective sets, and learning is performed as in expression (9) and expression (10) below. Here, each t-VAE of the 2nd VAE uses the parameters that have already been learned in the first stage as the initial value of the parameters at the time of learning.

$$\{x_a\} \rightarrow P'_{\theta'}(x_a) \quad (9)$$

[Math. 10]

$$\{x_b\} \rightarrow P''_{\theta''}(x_b) \quad (9)$$

In the 2nd VAE, the upper t-VAE learns the communication data of cluster 0, and the lower t-VAE learns the communication data of cluster 1, and parameters of the models of each cluster are updated. Note that the updated parameters of each model are output to the detection apparatus 20.

Subsequently, the integration unit 124 selects an anomaly score having the smaller value out of the anomaly scores of the two t-VAEs of the 2nd VAE as the final score, and ends the learning processing. Alternatively, the integration unit 124 integrates the anomaly scores of the two t-VAEs, obtains the final score (approximate value of $-\log p(x_i)$) being the anomaly score of the whole learning target data, and ends the learning processing.

In this manner, machine learning in the learning apparatus 10 performs parameter search at the time of optimizing an objective function. Usually, the initial value of the parameters is randomly given. It is considered that, with a large number of $x_a$, a parameter P of the VAE 1211 of the first stage and a parameter P' for $x_a$ of the second stage have substantially the same parameter.

Thus, in the second estimation unit 123 of the second stage, if the parameters that have already been learned in the first estimation unit 121 are used as the initial value of the parameters, learning is performed faster. The optimal parameter of $x_b$ may rather be worse if the parameter of the first stage is used. However, because $x_b$ has a small number of pieces of data, there is no great difference in calculation costs between a case in which the parameters of the first stage are used and a case in which the randomly given initial value is used.

As a result, in the learning apparatus 10, by using the parameters that have already been learned in the first estimation unit 121 as the initial value of the parameters in the second estimation unit 123 of the second stage, the speed of calculation is increased as a whole.

[Procedure of Detection Processing]

Subsequently, detection processing will be described. In the estimation unit for detection 211 of the detection apparatus 20, the parameters of the models updated through the learning of corresponding clusters in the learning apparatus 10 are applied to the respective VAEs.

Thus, when the detection apparatus 20 receives input of detection target data x', the detection apparatus 20 converts the probability density into the anomaly score as in equation (11) below.

$$\text{score} = \min(-P'_{\theta'}(x'), -P''_{\theta''}(x')) \quad (11)$$

The detection apparatus 20 sets a dedicated probability density estimation apparatus for each of $x_a$ and $x_b$. Then, for new data, the detection apparatus 20 adopts a lower anomaly score by using both of the probability density estimation apparatus. For example, if data of $x_a$ is used, only P' is to take a large value, and thus as the anomaly score, the anomaly score of $x_a$ is adopted. When the final score estimated by the estimation unit for detection 211 is higher than a predetermined threshold, the detection unit 22 detects that there is an abnormality in the detection target data.

[Processing Procedure of Learning Processing]

Figure 7:
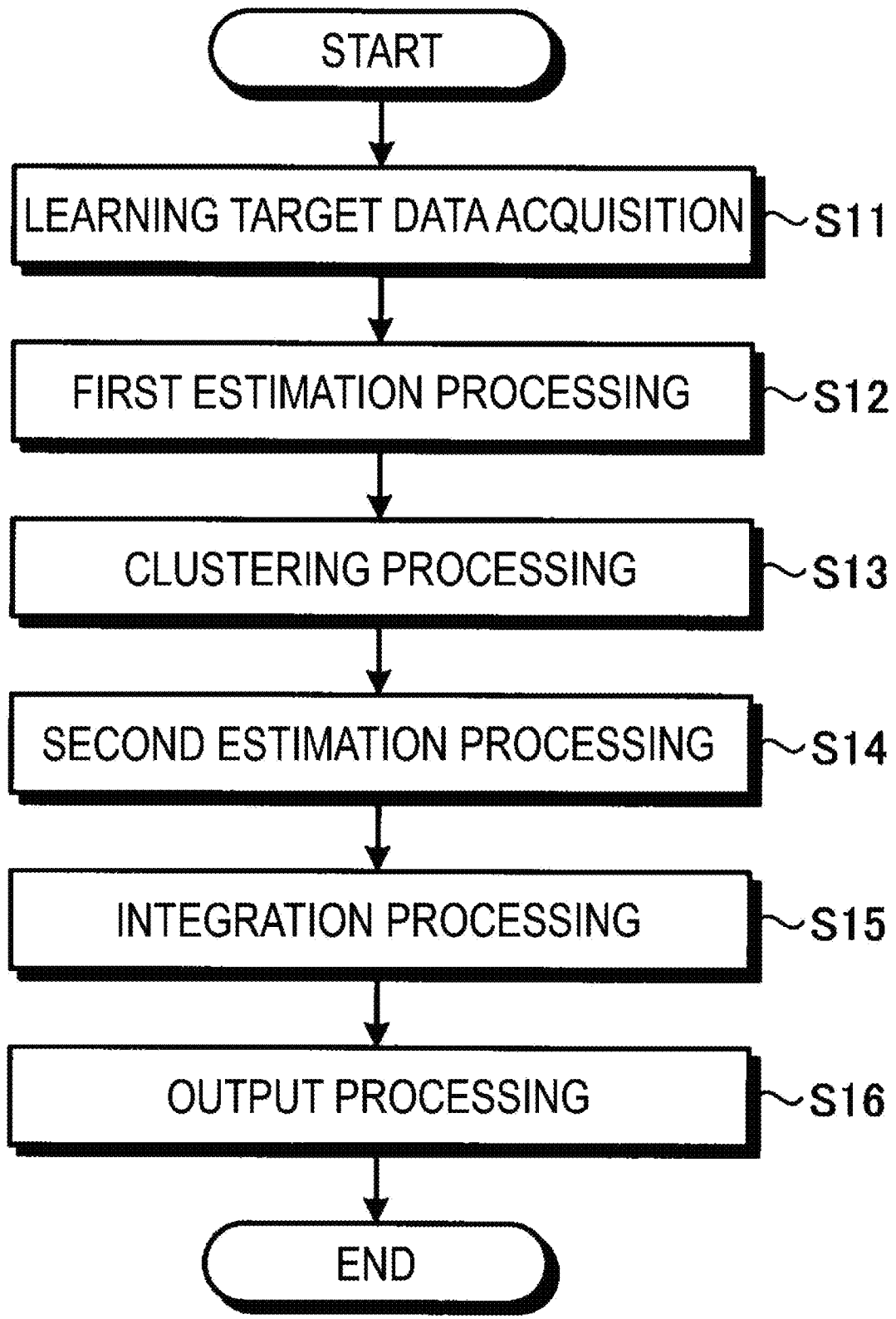
FIG. 7 is a flowchart illustrating a processing procedure of learning processing performed by the learning apparatus illustrated in FIG. 2.

Next, a processing procedure of the learning processing will be described. FIG. 7 is a flowchart illustrating a processing procedure of the learning processing performed by the learning apparatus 10 illustrated in FIG. 2.

First, as illustrated in FIG. 7, the acquisition unit 11 acquires the learning target data (Step S11), and outputs the acquired learning target data to the first estimation unit 121. The first estimation unit 121 performs first estimation processing of estimating the probability density of the learning target data acquired by the acquisition unit 11 by using the VAE 1211 (Step S12).

The clustering unit 122 performs clustering processing of clustering the learning target data according to the probability density estimated by the first estimation unit 121 (Step S13). Then, the second estimation unit 123 estimates the probability density of the learning target data for each cluster, and performs second estimation processing of updating the parameters of the models representing characteristics of the probability density of the learning target data for each cluster (Step S14). In Step S14, the second estimation unit 123 performs learning for each cluster that is clustered by the clustering unit 122 by using the first VAE 1231, the second VAE 1232, and the third VAE 1233. In this case, in the first VAE 1231, the second VAE 1232, and the third VAE 1233, the parameters that have already been learned in the first stage are used as the initial value of the parameters.

Subsequently, the integration unit 124 performs integration processing of integrating the probability density of each cluster that is estimated by respective VAEs of the second estimation unit 123 (Step S15). The learning apparatus 10 performs output processing of outputting the parameters of the models included in each cluster of the second estimation unit 123 and the prior distribution of each cluster adopted by the integration unit 124 that are updated by each VAE (Step S16), and ends the learning processing.

[Processing Procedure of Detection Processing]

Figure 8:
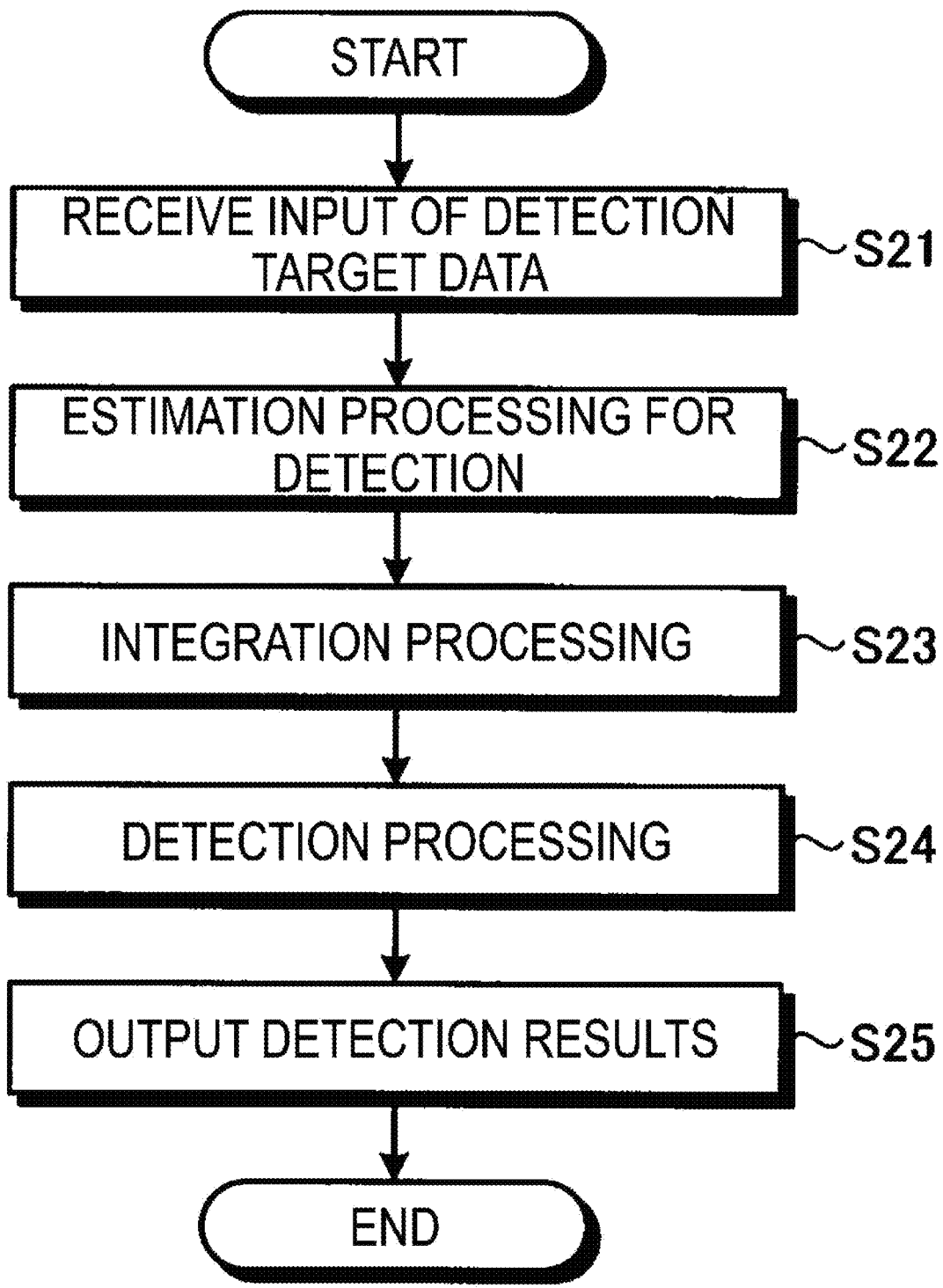
FIG. 8 is a flowchart illustrating a processing procedure of detection processing performed by the detection apparatus illustrated in FIG. 5.

Next, a processing procedure of the detection processing will be described. FIG. 8 is a flowchart illustrating a processing procedure of the detection processing performed by the detection apparatus 20 illustrated in FIG. 5.

First, as illustrated in FIG. 8, the detection apparatus 20 receives input of detection target data (Step S21). Then, in the estimation unit for detection 211, the first VAE 2111, the second VAE 2112, and the third VAE 2113 apply the parameters of the models updated by the second estimation unit 123, and perform estimation processing for detection of estimating the probability density of the detection target data (Step S22).

Subsequently, the integration unit 212 integrates the probability density estimated by each VAE of the estimation unit for detection 211 for the detection target data, and performs integration processing of outputting the probability density after integration to the detection unit 22 as the probability density of the detection target data (Step S23).

Then, the detection unit 22 performs detection processing of detecting presence or absence of an abnormality of the detection target data, based on the probability density of the detection target data estimated by the estimation unit for detection 211 (Step S24). Specifically, when the probability density of the detection target data estimated by the estimation unit for detection 211 is lower than a predetermined threshold, the detection unit 22 detects that there is an abnormality in the detection target data. Then, the detection unit 22 outputs detection results to an external apparatus that copes with the abnormality or the like (Step S25), and ends the detection processing.

EXAMPLE

Figure 9:
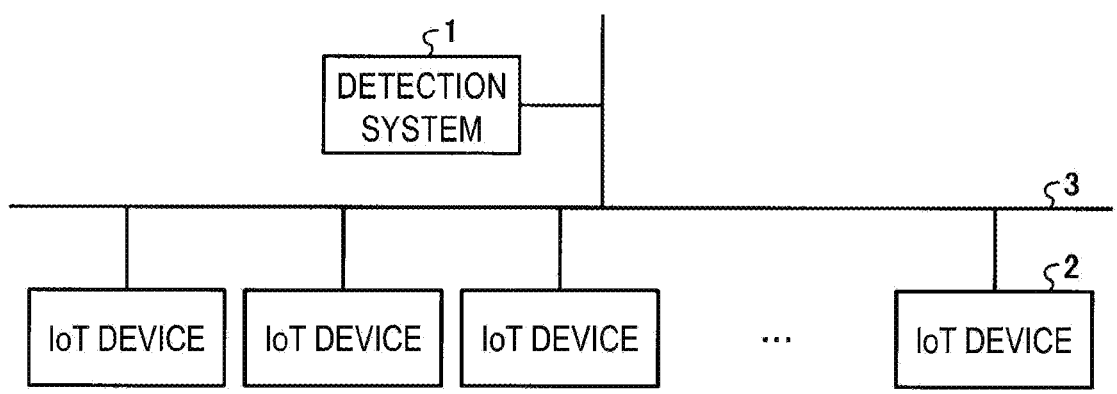
FIG. 9 is a diagram illustrating an application example of the detection system according to the embodiment.

For example, the detection system 1 according to the present embodiment can be applied to abnormality detection of an IoT apparatus. FIG. 9 is a diagram illustrating an application example of the detection system 1 according to the embodiment.

As illustrated in FIG. 9, the detection system 1 is provided in a network 3 to which a plurality of IoT apparatus 2 are connected. In this case, the detection system 1 collects traffic session information transmitted and received by the IoT apparatus 2, and performs learning of the probability density of normal traffic sessions and detection of abnormal traffic sessions. The learning processing is applied to the learning of the probability density of the normal traffic sessions, and even when there is a difference in the number of pieces of data between pieces of traffic session data, the learning is performed accurately and at high speed. Further, the detection processing is applied to the detection of the abnormal traffic sessions, and the probability density estimation to which the model parameters learned in the learning processing are applied is performed, and high-accuracy abnormality detection is performed.

[Evaluation Experiment]

Next, evaluation was performed on the traffic session data between actual IoT apparatus by using a learning method according to the present embodiment and a known learning method. The learning method according to the present embodiment is a method in which the parameters that have already been learned in the first stage are used as the initial value of the parameters in the learning of the second stage. The known learning method is a method in which the initial value of the parameters is randomly given in the learning of the second stage. Note that clustering in the experiment was performed with the anomaly score. Further, in the experiment, the data of the learning target is clustered into cluster 0 to cluster 3, based on the anomaly score of the VAE of the first stage, and thus four probability density estimation apparatus corresponding to four respective clusters are provided as the VAEs of the second stage.

Figures 1, 10:
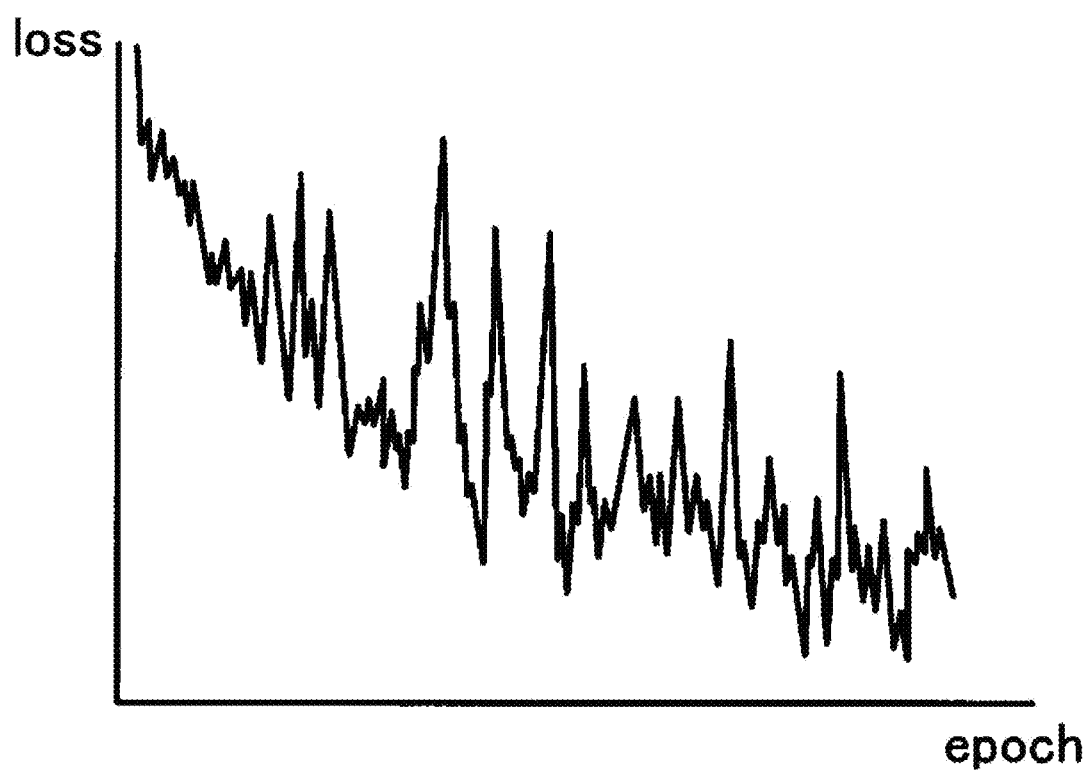
Figures 2, 10:
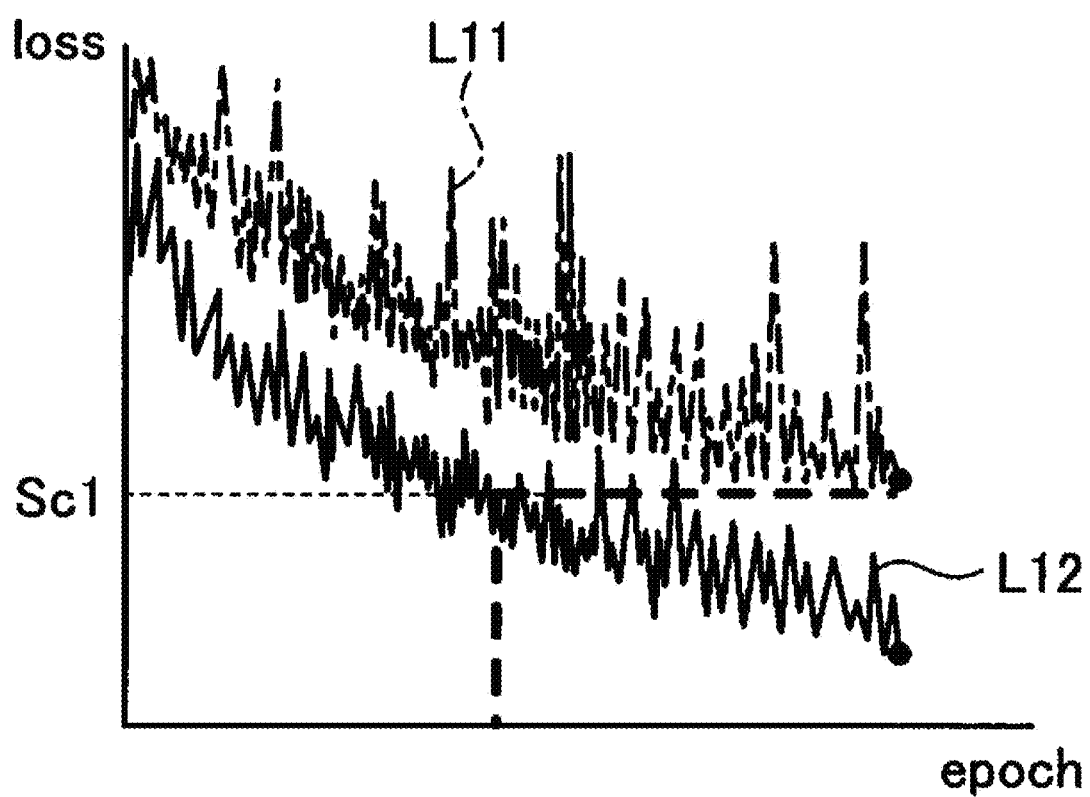
Figures 3, 10:
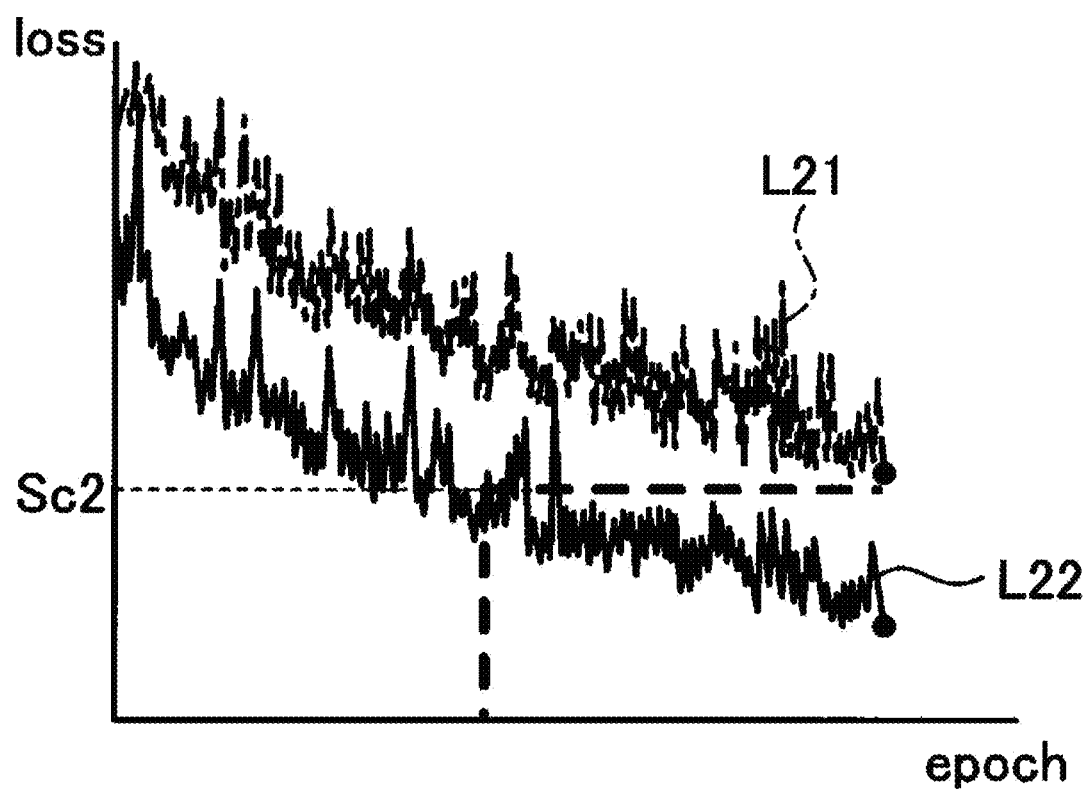
Figures 4, 10:
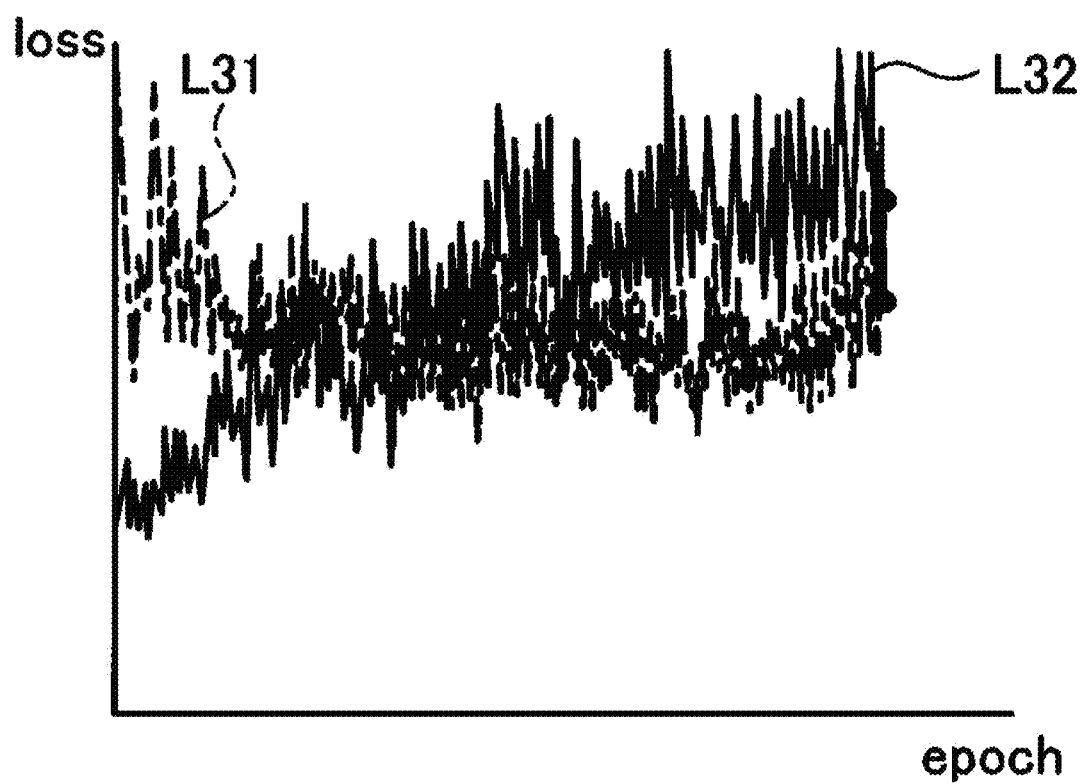
Figures 5, 10:
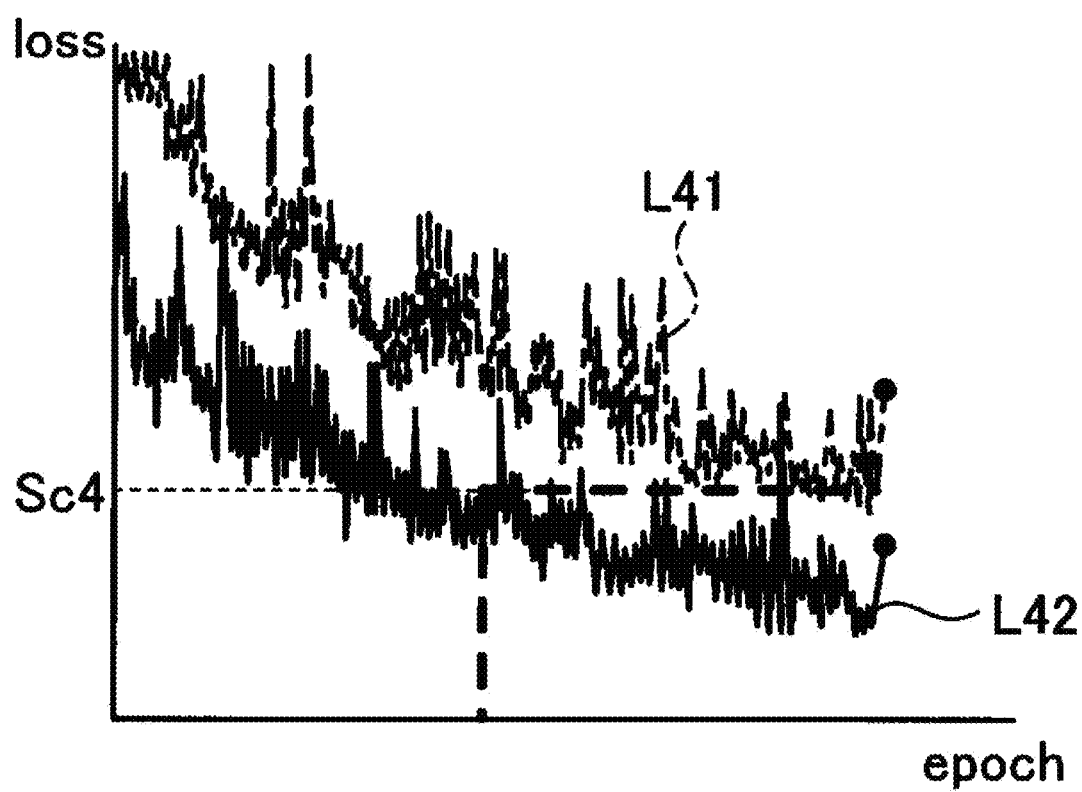

FIG. 10-1 is a diagram illustrating learning results in the VAE of the first stage. FIG. 10-2 is a diagram illustrating learning results for cluster 0 in the VAE of the second stage. FIG. 10-3 is a diagram illustrating learning results for cluster 1 in the VAE of the second stage. FIG. 10-4 is a diagram illustrating learning results for cluster 2 in the VAE of the second stage. FIG. 10-5 is a diagram illustrating learning results for cluster 3 in the VAE of the second stage. In each graph of the learning results, the vertical axis represents the anomaly score (loss value), and the horizontal axis represents epochs of the learning.

In FIGS. 10-2, 10-3, 10-4, and 10-5, curved lines L11, L21, L31, and L41 show learning results corresponding to the known method, and curved lines L12, L22, L32, and L42 show learning results corresponding to the learning method according to the present embodiment.

There is no change in the learning results in the VAE of the first stage. In contrast, as shown by the curved lines L12, L22, and L42 of FIGS. 10-2, 10-3, and 10-5, when the learning method according to the present embodiment is applied, in comparison to the known method, approximately the half epoch is sufficient until reduction down to anomaly scores Sc1, Sc2, and Sc4. Thus, it is made clear that the learning method according to the present embodiment implements high speed of approximately double speed of that of the known method.

[Effects of Embodiment]

In this manner, the learning apparatus 10 according to the present embodiment estimates the probability density of the learning target data, and then clusters the learning target data according to the probability density, and performs learning for each cluster anew. Specifically, the learning apparatus 10 estimates the probability density of the learning target data of each cluster, and updates the parameters of the models representing characteristics of the probability density of the learning target data of each cluster. Then, the learning apparatus 10 integrates the probability density of each cluster.

Thus, first, the learning apparatus 10 performs probability density estimation and clustering in the learning of the first stage, and thereby enables clustering according to the density of the data. Then, in the learning of the second stage, the learning apparatus 10 prepares the VAEs for each cluster, causes the VAEs to learn the learning target data individually for each cluster, and integrates the probability density of each cluster.

In the learning of the second stage, the parameters that have already been learned in the first estimation unit 121 are used as the initial value of the parameters. As a result, the learning apparatus 10 can accurately perform learning even for the learning target data having a small number of pieces of data, and can increase the speed of learning. In other words, according to the learning apparatus 10, even when there is a difference in the number of pieces of data between pieces of the learning target data, the probability density of the learning target data can be accurately learned at high speed, and the models with which abnormality detection can be performed with high accuracy can be obtained.

Further, in the detection apparatus 20, as many VAEs as the number of the VAEs of the learning apparatus 10 are provided, and the obtained models are applied, and the results obtained by integrating the probability density of each VAE for the detection target data are used as the probability density estimation results. In this manner, in the detection apparatus 20, the probability density estimation can be performed with high accuracy, and accordingly, reduction of erroneous detection can be implemented, and a detection rate can be enhanced.

[First Modification]

Figure 11:
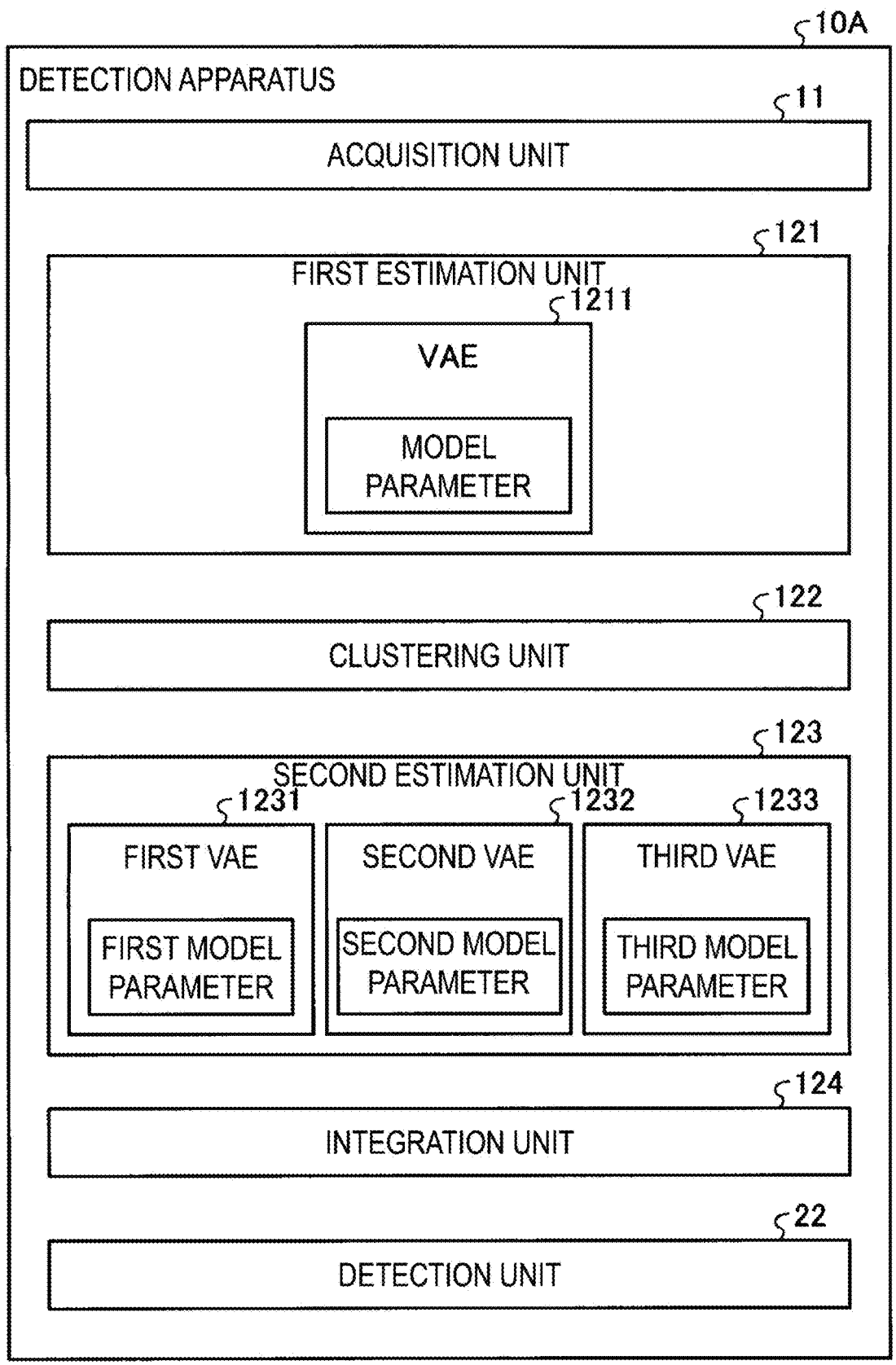
FIG. 11 is a diagram illustrating an example of another configuration of a detection apparatus according to the embodiment.

In the embodiment, the learning apparatus 10 and the detection apparatus 20 are described as independent apparatuses. However, this is not restrictive, and the learning apparatus 10 and the detection apparatus 20 may be an apparatus in which a learning function and a detection function are integrated. FIG. 11 is a diagram illustrating an example of another configuration of a detection apparatus according to the embodiment.

As illustrated in FIG. 11, a detection apparatus 10A includes the acquisition unit 11, the first estimation unit 121, the clustering unit 122, the second estimation unit 123, the integration unit 124, and the detection unit 22.

In a case of a learning phase, the detection apparatus 10A performs the first estimation processing of the first estimation unit 121, the clustering processing of the clustering unit 122, and the second estimation processing of the second estimation unit 123 on the learning target data acquired by the acquisition unit 11, and updates the model parameters of each VAE of the second estimation unit 123. The integration unit 124 integrates the probability density of each cluster that is estimated by the respective probability density estimation apparatus of the second estimation unit 123.

In a case of a detection phase, the second estimation unit 123 applies the parameters of the models updated in the learning phase to each VAE for the detection target data acquired by the acquisition unit 11, and estimates the probability density of the detection target data. Then, the integration unit 124 integrates each estimated probability density, and outputs the probability density after integration to the detection unit 22 as the probability density of the detection target data. The detection unit 22 performs detection processing of detecting presence or absence of an abnormality of the detection target data, based on the probability density of the detection target data estimated by the second estimation unit 123.

[System Configuration and the Like]

The respective components of the respective apparatuses illustrated are functional and conceptual components, and are not necessarily physically configured as illustrated. That is, a specific form of distribution and integration of the respective apparatuses is not limited to the illustrated form, and all or a portion thereof can be configured to be functionally or physically distributed and integrated in any units according to various loads, use situations, and the like. Further, all or some of processing functions performed by each apparatus may be implemented by a CPU and a program that is analyzed and executed by the CPU, or may be implemented as hardware based on a wired logic.

Further, all or some of the processes described as being performed automatically among the respective processes described in the embodiment can be performed manually, or all or some of the processes described as being performed manually can be performed automatically using a known method. Furthermore, the processing procedures, the control procedures, the specific names, and the information including various types of data and parameters described in the present specification and the drawings can be optionally changed unless otherwise mentioned.

[Program]

Figure 12:
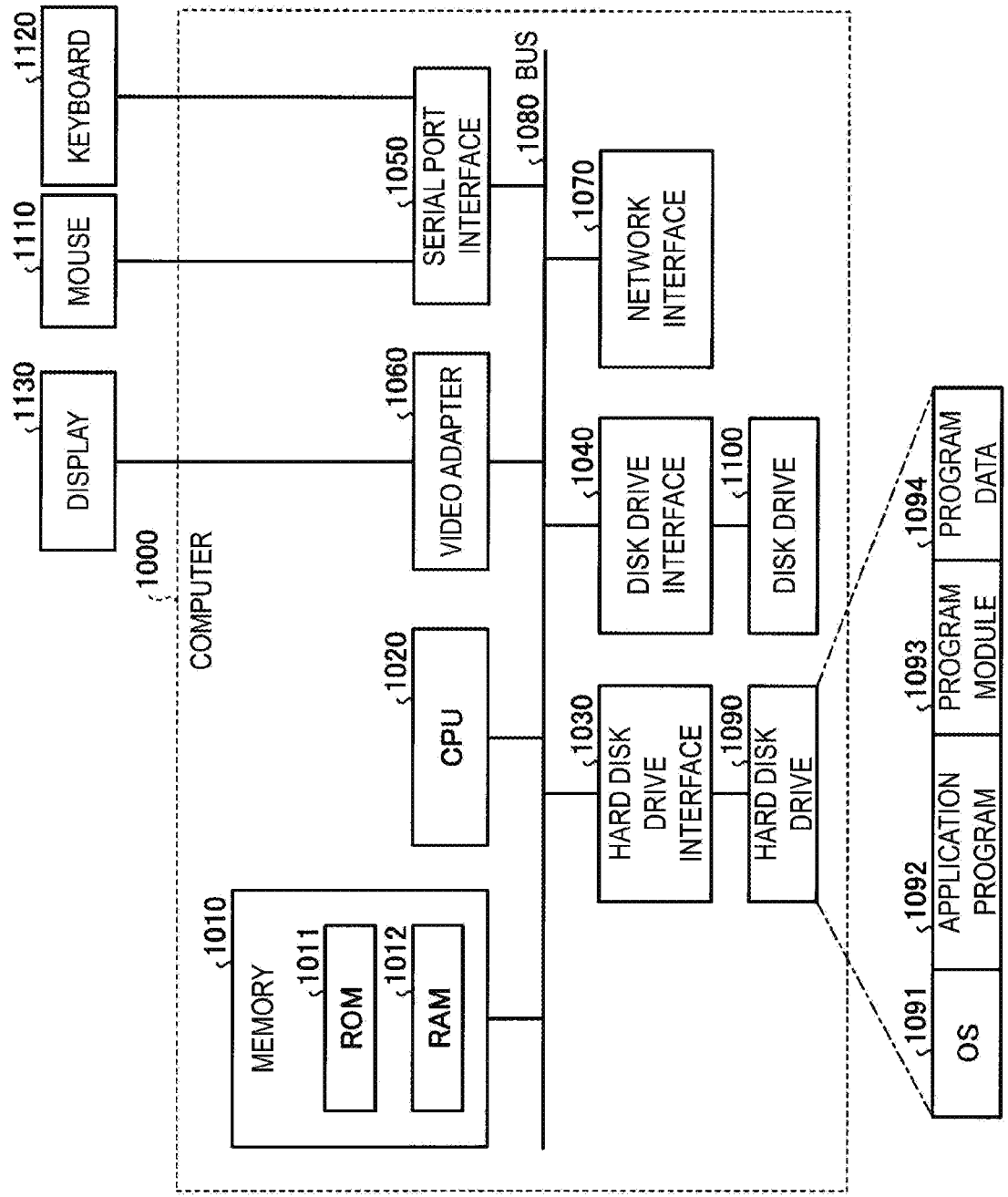
FIG. 12 is a diagram illustrating an example of a computer in which the learning apparatus and the detection apparatus are implemented through execution of a program.

FIG. 12 is a diagram illustrating an example of a computer in which the learning apparatus 10 and the detection apparatus 20 are implemented through execution of a program. A computer 1000 includes, for example, a memory 1010 and a CPU 1020. In addition, the computer 1000 includes a hard disk drive interface 1030, a disk drive interface 1040, a serial port interface 1050, a video adapter 1060, and a network interface 1070. These units are connected to each other through a bus 1080.

The memory 1010 includes a ROM 1011 and a RAM 1012. The ROM 1011 stores a boot program such as, for example, a basic input output system (BIOS). The hard disk drive interface 1030 is connected to a hard disk drive 1090. The disk drive interface 1040 is connected to a disk drive 1100. A removable storage medium such as, for example, a magnetic disc or an optical disc is inserted into the disk drive 1100. The serial port interface 1050 is connected to, for example, a mouse 1110 and a keyboard 1120. The video adapter 1060 is connected to a display 1130, for example.

The hard disk drive 1090 stores, for example, an operating system (OS) 1091, an application program 1092, a program module 1093, and program data 1094. In other words, a program defining each process of the learning apparatus 10 and the detection apparatus 20 is implemented as the program module 1093 in which a code executable by the computer is described. The program module 1093 is stored in, for example, the hard disk drive 1090. For example, the program module 1093 for executing a similar process to that of a functional configuration in the learning apparatus 10 and the detection apparatus 20 is stored in the hard disk drive 1090. Meanwhile, the hard disk drive 1090 may be replaced with a solid state drive (SSD).

Further, setting data used in the process of the embodiment described above is stored as the program data 1094 in the memory 1010 or the hard disk drive 1090, for example. The CPU 1020 reads out and executes the program module 1093 or the program data 1094 stored in the memory 1010 and the hard disk drive 1090, as necessary, in the RAM 1012.

The program module 1093 and the program data 1094 are not necessarily stored in the hard disk drive 1090, and may be stored in, for example, a removable storage medium and be read out by the CPU 1020 through the disk drive 1100 or the like. Alternatively, the program module 1093 and the program data 1094 may be stored in another computer connected via a network (LAN, a wide area network (WAN), or the like). The program module 1093 and the program data 1094 may be read out by the CPU 1020 from another computer through the network interface 1070.

Although embodiments to which the invention made by the present inventor has been applied have been described above, the present invention is not limited to the description and the drawings that form part of the disclosure of the present invention according to the embodiments. That is, all other embodiments, examples, operation techniques, and the like made by those skilled in the art on the basis of the present embodiments are included in the scope of the present invention.

REFERENCE SIGNS LIST

1 Detection system
2 IoT apparatus
3 Network
10 Learning apparatus
11 Acquisition unit
12 Learning unit
20 Detection apparatus
21 Estimation unit
22 Detection unit
30 Collection apparatus
121 First estimation unit
122 Clustering unit
123 Second estimation unit
124, 212 Integration unit
211 Estimation unit for detection
1211 VAE
1231, 2111 First VAE
1232, 2112 Second VAE
1233, 2113 Third VAE

The invention claimed is:

1. A learning apparatus comprising:
a memory; and
a processor coupled to the memory and configured to:
  acquire a plurality of pieces of normal communication data being a learning target;
  perform first learning to learn the normal communication data, estimate a probability density of the normal communication data, and update a parameter of a model;
  cluster the normal communication data into a plurality of clusters according to the probability density estimated;
  perform second learning for each cluster of the plurality of clusters, and estimate respective pieces of probability density of the normal communication data for respective clusters and update a parameter of a model representing characteristics of the probability density of the normal communication data for each of the clusters by using, as an initial value of the parameter, the parameter of the model updated in the first learning; and
  integrate the respective pieces of probability density for the respective clusters that are estimated.

2. The learning apparatus according to claim 1, wherein to perform the learning, the processor includes a probability density estimator for the respective clusters, and
each of probability density estimator performs learning for a corresponding cluster by using, as the initial value of a parameter, the parameter learned in the learning, and updates the parameter of the model included in the corresponding cluster.

3. The learning apparatus according to claim 2, wherein each probability density estimator is a variational auto encoder (VAE).

4. The learning apparatus according to claim 1, wherein the processor is further configured to:
  acquire detection target communication data;
  apply the model, after integration of the respective pieces of probability density for the respective clusters, to the detection target communication data; and
  determine whether the detection target communication data includes an abnormality based on application of the model.

5. The learning apparatus according to claim 4, wherein the processor is configured to determine that the detection target communication data has the abnormality in a case that an estimated probability density for the detection target communication data is below a predetermined threshold.

6. The learning apparatus according to claim 5, wherein the processor is further configured to output a notification that the detection target communication data includes the abnormality to an other device.

7. The learning apparatus according to claim 4, wherein a number of pieces of normal communication data differs from a number of pieces of detection target communication data.

8. The learning apparatus according to claim 7, wherein the normal communication data includes HTTP communication data.

9. The learning apparatus according to claim 8, wherein the detection target communication data includes FTP communication data.

10. The learning apparatus according to claim 1, wherein the processor is configured to estimate the probability density of the normal communication data using a variational auto encoder (VAE).

11. The learning apparatus according to claim 10, wherein the VAE outputs an anomaly score based on the probability density of the normal communication data.

12. The learning apparatus according to claim 11, wherein the probability score is the negative logarithm of the probability density of the normal communication data.

13. The learning apparatus according to claim 11, wherein the processor is configured to cluster the normal communication data using a Bayesian Gaussian mixture model algorithm or a variational Bayesian Gaussian mixture model algorithm.

14. The learning apparatus according to claim 1, wherein the respective pieces of the probability density for the respective clusters that are integrated by the processor include current and past probability densities for the respective clusters.

15. A learning method executed by a learning apparatus, the learning method comprising:

acquiring a plurality of pieces of normal communication data being a learning target;

first learning the normal communication data, estimating probability density of the normal communication data, and updating a parameter of a model;

clustering the normal communication data into a plurality of clusters according to the probability density estimated;

performing second learning for each cluster of the plurality of clusters, and estimating respective pieces of probability density of the normal communication data for respective clusters and updating a parameter of a model representing characteristics of the probability density of the normal communication data for each of the clusters by using, as an initial value of the parameter, the parameter of the model updated in the first learning of the normal communication data; and integrating the respective pieces of probability density for the respective clusters that are estimated.

16. A non-transitory, computer-readable recording medium having stored therein an analysis program for causing a computer to execute a process comprising:

acquiring a plurality of pieces of normal communication data being a learning target;

first learning the normal communication data, estimating probability density of the normal communication data, and updating a parameter of a model;

clustering the normal communication data into a plurality of clusters according to the probability density estimated;

performing second learning for each cluster of the plurality of clusters, and estimating respective pieces of probability density of the normal communication data for respective clusters and updating a parameter of a model representing characteristics of the probability density of the normal communication data for each of the clusters by using, as an initial value of the parameter, the parameter of the model updated in the first learning of the normal communication data; and integrating the respective pieces of probability density for the respective clusters that are estimated.

* * * * *